(12) United States Patent
Haran et al.

(10) Patent No.: US 10,120,003 B2
(45) Date of Patent: Nov. 6, 2018

(54) RSSI BASED V2X COMMUNICATION PLAUSABILITY CHECK

(71) Applicant: AUTOTALKS LTD., Kfar Netter (IL)

(72) Inventors: Onn Haran, Bnei Dror (IL); Ariel Feldman, Raanana (IL); Nir Raviv, Tel Aviv (IL)

(73) Assignee: Autotalks LTD, Kfar Netter (IL)

( * ) Notice: Subject to any disclaimer, the term of this patent is extended or adjusted under 35 U.S.C. 154(b) by 24 days.

(21) Appl. No.: 15/613,296

(22) Filed: Jun. 5, 2017

(65) Prior Publication Data

US 2017/0365171 A1  Dec. 21, 2017

Related U.S. Application Data

(60) Provisional application No. 62/351,964, filed on Jun. 19, 2016.

(51) Int. Cl.
*H04W 4/46* (2018.01)
*G01S 11/06* (2006.01)
(Continued)

(52) U.S. Cl.
CPC ........ *G01R 21/1331* (2013.01); *G01S 19/215* (2013.01); *G06F 11/00* (2013.01); *G08G 1/09675* (2013.01); *G08G 1/096716* (2013.01); *G08G 1/096741* (2013.01); *G08G 1/096791* (2013.01); *H04B 17/27* (2015.01);
(Continued)

(58) Field of Classification Search
CPC ... G01R 21/1331; G01S 11/06; G01S 19/215; G08G 1/096716; G08G 1/096741; G08G 1/09675; G08G 1/096791; H04B 17/27; H04B 17/318; H04W 4/46; G06F 11/00
See application file for complete search history.

(56) References Cited

U.S. PATENT DOCUMENTS 6,985,103 B2 * 1/2006 Ridderheim .............. G01S 5/12
                                                            342/175
8,611,849 B2 * 12/2013 Snider ................. B60R 25/1025
                                                            342/20
(Continued)

OTHER PUBLICATIONS

Yingying Chen et al; "Detecting and Localizing Identity-Based Attacks in Wireless and Sensor Networks"; IEEE Transactions on Vehicular Technology, Jun. 2010, pp. 2418-2434, vol. 59, No. 5.
(Continued)

*Primary Examiner* — Nicholas Kiswanto
(74) *Attorney, Agent, or Firm* — Nathan & Associates; Menachem Nathan (57) ABSTRACT

System and methods for plausibility check in vehicle-to-everything dynamic environments in which a local vehicle communicates with remote vehicles. The system comprises means for obtaining a measured RSSI from a specific remote vehicle, and a modified plausibility check unit configurable and operable to apply a dynamic RSSI model to detect implausible positioning of the specific remote vehicle and/or of the local vehicle based on the measured RSSI of the specific remote vehicle and on a RSSI calculated for the specific remote vehicle. Decisions on respective further actions to be performed by the specific remote vehicle and by the local vehicle are made based on respective plausibility checks applied to both vehicles using the dynamic RSSI model.

20 Claims, 4 Drawing Sheets

(51) Int. Cl.
*G01S 19/21* (2010.01)
*G06F 11/00* (2006.01)
*H04B 17/27* (2015.01)
*G01R 21/133* (2006.01)
*G08G 1/0967* (2006.01)
*H04B 17/318* (2015.01)

(52) U.S. Cl.
CPC ............ *H04B 17/318* (2015.01); *G01S 11/06* (2013.01); *H04W 4/46* (2018.02)

(56) References Cited

U.S. PATENT DOCUMENTS

| | | | | |
|---|---|---|---|---|
| 8,954,261 B2* | 2/2015 | Das | ........................ | G08G 1/163 342/457 |
| 9,418,549 B2* | 8/2016 | Kang | .................. | G08G 1/0969 |
| 9,476,720 B2* | 10/2016 | Nagura | .................. | G01C 21/30 |
| 2006/0052115 A1* | 3/2006 | Khushu | ................. | G01S 5/0263 455/456.3 |
| 2008/0234930 A1* | 9/2008 | Cheok | .................. | G01S 5/0284 701/408 |
| 2018/0159935 A1* | 6/2018 | Cavalcanti | .............. | H04W 4/44 |

OTHER PUBLICATIONS

Akshaya S. U. et al; "Survey on RSSI Based Sybil Defense"; International Journal of Advanced Research in Computer and Communication Engineering, Sep. 2015, pp. 34-37, vol. 4, Issue 9.

Norbert Birmeyer; "Misbehavior Detection and Attacker Identification in Vehicular Ad hoc Networks"; The Department 20 Computer Science, The Technical University of Darmstadt, Dissertation for obtaining the academic degree of a Doctoral Engineer (Dr.-Ing.), 2014.

* cited by examiner

RSSI BASED V2X COMMUNICATION PLAUSABILITY CHECK

CROSS REFERENCE TO RELATED APPLICATIONS

This application is related to and claims priority from U.S. Provisional Patent Application 62/351,964 filed Jun. 19, 2016, which is incorporated herein by reference in its entirety.

FIELD

Embodiments of the invention relate generally to vehicle-based communications, and in particular to positioning of vehicles based on such communications.

BACKGROUND

Vehicle-based communications include (but are not limited to) vehicle-to-vehicle (V2V), vehicle-to-pedestrian (V2P), vehicle-to-motorcycle (V2M) and vehicle-to-infrastructure (V2I) communications. All can be bundled under a general term—vehicle-to-everything or "V2X" communications. V2X communications use positioning data to make safety decisions. Bad positioning data may lead to a false alert or to missing an alert. As use of V2X communications in autonomous driving decisions is imminent, the bad positioning events need to be detected. The detection of bad positioning events is referred to herein as "misbehavior detection". "Plausibility checks" are applied to identify such events.

Global Navigation Satellite System (GNSS) positioning may suffer from errors, for example when satellites are obstructed and/or when sensors feeding dead-reckoning algorithms are noisy or not calibrated. Ever more worrisomely, GNSS data may be a subject to attacks, for example by feeding the data with a GNSS simulator. A GNSS receiver typically lacks the ability to identify an attack. The communication bus in a vehicle may be under attack as well, potentially manipulating the dead-reckoning algorithm. Detection of attacks in remote vehicles (or "remote units") is far more complex than in a local vehicle (or "local unit").

Figure 1:
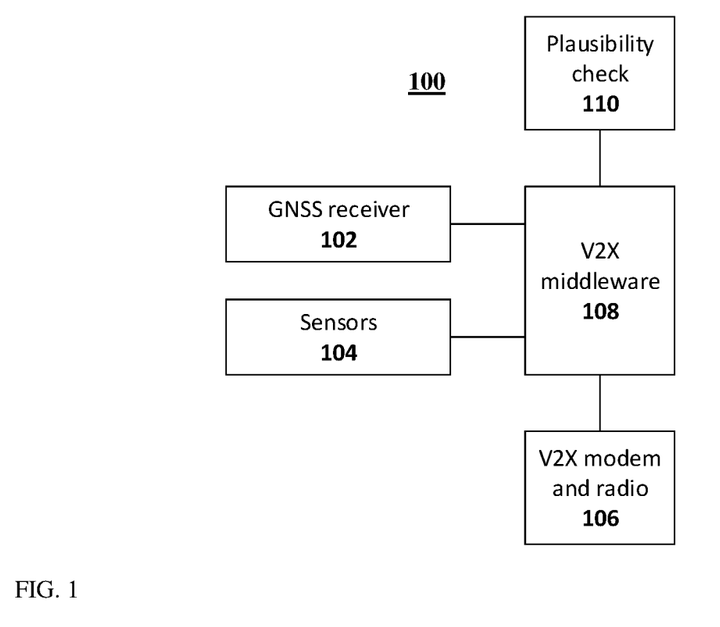
FIG. 1 illustrates a known system for positioning plausibility check.

A misbehavior detection method applies a plausibility check. The plausibility check is expected to validate local unit GNSS receiver integrity and remote unit GNSS receiver integrity. FIG. 1 illustrates a known V2X communications system 100 capable of performing such positioning plausibility check. System 100 comprises a GNSS receiver 102 for providing fresh positioning information embedded in transmitted messages and used in internal calculations that provide position information; one or more inertial sensors 104 for providing correction inputs to the GNSS receiver calculation of the position information, where reception from satellites is inaccurate or infrequent enough; a V2X modem and radio unit 106 for transmitting and receiving messages including the position information; V2X middleware 108 responsible for running V2X networking, security and facilities functions; and a plausibility check unit 110 configurable and operable to analyze each received message and to estimate if the position information received from GNSS receiver 102 and potentially augmented by data received from inertial sensors 104 is plausible. In addition, plausibility check unit 110 may detect if GNSS receiver 102 or inertial sensors 104 have been compromised or malfunctioned.

Sensors 104 may be located on the same printed circuit board (PCB) or remotely in a different physical unit. V2X radio unit 106 may follow any direct communication protocol including IEEE802.11p and its potential successors or cellular V2V. Middleware 108 prepares the content of a packet for transmission and parses the content of a received packet. Plausibility check unit 110 may perform its function using any known method (like checking for an illegal field in each parsed packet or overlap between positions of different vehicles) or using a method disclosed herein. Each component of system 100 can be physically separated from other elements. Some of these components may be implemented in software (SW), some may be implemented in hardware (HW) and some in both SW and HW.

The reliability of a plausibility check in a dynamic environment and its real-time implementation in such an environment are very problematic. In a dynamic environment, the distances between vehicles change constantly, leading to unstable Received Signal Strength Indicator (RSSI) measurements; the reflections from the environment, for example from buildings or other cars, harm the RSSI stability as well; the movement of vehicles can obstruct or stop obstructing other vehicles, creating huge jumps in RSSI values; and environment changes, such as a hill suddenly blocking vehicles, impact the measurement as well.

A RSSI based plausibility check against Sybil attacks in sensor networks was proposed by Yingying Chen et al., IEEE Transactions on Vehicular Technology, Vol. 59, No. 5, June 2010. In a Sybil attack, a single unit sends information as if it were multiple units. A particle filter is used to detect this effect. The position of remote units is analyzed over time to determine if a received transmission is from a single unit or from multiple ones. However, this plausibility check cannot detect a manipulated or faulty GNSS receiver. Also, the complexity of this check is too high. The model suggested by Chen does not fit a dynamic environment.

Known plausibility check solutions for dynamic environments use data-based filtering. A plausible/implausible decision is based on inspecting fields inside packets. Such a solution is unsatisfactory, since a sophisticated attacker may forge the data to overcome the detection methods. Physical detection methods based on RSSI cannot be forged, but they do not exist for dynamic environments. RSSI based plausibility checks are applied in static sensor networks and to date have been considered as not very reliable.

There is therefore a need for, and it would be advantageous to have, reliable methods and systems for plausibility check in V2X dynamic environments, to detect implausible positioning of a misbehaving vehicle, either remote or local.

SUMMARY

Embodiments disclosed herein disclose a system and method for using RSSI to analyze the plausibility that a vehicle's ground true position aligns with its reported position. The analysis of RSSI and reported position from multiple vehicles can teach if the local vehicle (also referred to as "self-vehicle" or "ego-vehicle") itself has wrong knowledge of its position.

Error in reported positioning may originate from two sources: attack on a specific received remote vehicle and attack on the local vehicle. It is very important to distinguish between the two, because the actions to be taken in each case are totally different. An attack on a remote vehicle can be ignored, since RSSI detection does not provide sufficient reliability. However, in the case of an attack on a local vehicle, the local vehicle should stop transmitting. Any detection algorithm is adjusted to detection ratio vs. false-detection ratio. Having a high false-detection implies lower safety (because the overall safety provided by the V2X system is decreased) as messages are ignored, or because the V2X unit of the local vehicle stops transmitting. On the other hand, messages from suspicious vehicles cannot be allowed for processing, since the information may influence a driver to make unsafe decisions. Therefore, a reliable mechanism is needed for increasing both probabilities (i.e. for obtaining high detection probability and low false-detection probability).

The concept of operation is based on a learning algorithm that matches the RSSI associated with a message received from a remote vehicle with a RSSI expected according to vehicle environment. The algorithm is also referred to as "RSSI model". For each vehicle, the vehicle surrounding is partitioned into sectors (see e.g. FIG. 3) related to and aligned to the vehicle frame. The sector alignment to the vehicle frame means that sectors are rotated to match the heading of the vehicle. For example, if the vehicle heads south, the front sector contains all elements on a road south of the vehicle, and if the vehicle heads north, the front sector contains all elements on a road north of the vehicle.

The RSSI model is built per sector, because each sector introduces different properties. The RSSI model is dynamic because vehicles are dynamic. The RSSI attenuation for a given distance is learned dynamically, and a different value of a parameter representing the channel model is stored per each sector. The RSSI model considers variations related to uneven antenna patterns and specific obstructions on the road, either dynamic, like trucks, or static, like buildings.

In exemplary embodiments, there are provided methods for plausibility check in a V2X dynamic environment in which a local vehicle communicates with remote vehicles, comprising obtaining a measured RSSI from a specific remote vehicle, calculating an expected RSSI for the specific remote vehicle using a dynamic RSSI model, performing a respective plausibility check for each of the specific remote vehicle and the local vehicle using the specific remote vehicle measured RSSI and the calculated expected RSSI, and, based on results of the respective plausibility checks, deciding on respective further actions to be performed by the specific remote vehicle and by the local vehicle.

In various exemplary method embodiments, the local vehicle has a frame with a plurality of sectors adjusted thereto and a specific sector of the plurality of sectors is associated with the specific remote vehicle, and the actions of obtaining a measured RSSI, calculating a calculated RSSI using the dynamic RSSI model, performing a plausibility check for each of the specific remote vehicle and the local vehicle and deciding on respective further actions to be performed by the specific remote vehicle and by the local vehicle are all performed per the specific sector.

In an exemplary method embodiment, the calculating an expected RSSI for the specific remote vehicle using a dynamic RSSI model includes calculating using a RSSI model dynamically adjusted for each measured RSSI per distance of the specific remote vehicle from the local vehicle.

In an exemplary method embodiment, the performing a plausibility check includes performing the check using convergence of the RSSI model and an input from a database of plausibilities of received remote vehicles.

In an exemplary method embodiment, the deciding on respective further actions includes deciding to reduce the plausibility of the local vehicle if a result of the plausibility check indicates that the specific remote vehicle is implausible.

In an exemplary method embodiment, the deciding on respective further actions includes deciding to stop transmission by the local vehicle if a result of the plausibility check indicates that the local vehicle is implausible.

In an exemplary method embodiment, the deciding on respective further actions includes deciding to continue transmission by the local vehicle if a result of the plausibility check indicates that the local vehicle is plausible.

In an exemplary embodiment, a method further comprises updating the dynamic RSSI model if the plausibility check for the specific remote vehicle indicates that the specific remote vehicle is plausible.

In various exemplary method embodiments, the calculating an expected RSSI for the specific remote vehicle using a dynamic RSSI model includes calculating using a RSSI model dynamically adjusted for each measured RSSI per distance of the specific remote vehicle from the local vehicle.

In various exemplary method embodiments, the calculating using a RSSI model dynamically adjusted for each measured RSSI per distance includes calculating by applying a $2^{nd}$ order model for propagation that considers both a linear change coefficient of attenuation relative to a logarithm of the distance and a change in the linear change coefficient of attenuation relative to the same logarithm of distance.

In an exemplary embodiment, there is provided a system for plausibility check in a V2X dynamic environment in which a local vehicle communicates with remote vehicles, comprising means for obtaining a measured RSSI from a specific remote vehicle, and a modified plausibility check unit configurable and operable to apply a dynamic RSSI model to detect implausible positioning of the specific remote vehicle and/or of the local vehicle based on the measured RSSI of the specific remote vehicle and on a RSSI calculated for the specific remote vehicle.

In an exemplary system embodiment, the modified plausibility check unit comprises a RSSI misbehavior detection unit that includes a RSSI model estimation module for estimating and for updating the dynamic RSSI model.

In an exemplary system embodiment, the modified plausibility check unit comprises a vehicle database management module for managing a database of vehicle plausibilities used in plausibility checks.

In an exemplary system embodiment, the modified plausibility check unit comprises a misbehavior enforcement unit for responding to detected misbehavior by deciding on respective further actions to be performed by the specific remote vehicle and by the local vehicle.

In various exemplary embodiments, the local vehicle has a frame with a plurality of sectors adjusted thereto, a specific sector of the plurality of sectors is associated with the specific remote vehicle, and the modified plausibility check unit is configurable and operable to apply the dynamic RSSI model for the specific sector.

BRIEF DESCRIPTION OF THE DRAWINGS

Aspects, embodiments and features disclosed herein will become apparent from the following detailed description when considered in conjunction with the accompanying drawings. Like elements may be numbered with like numerals in different figures.

DETAILED DESCRIPTION

Figure 2:
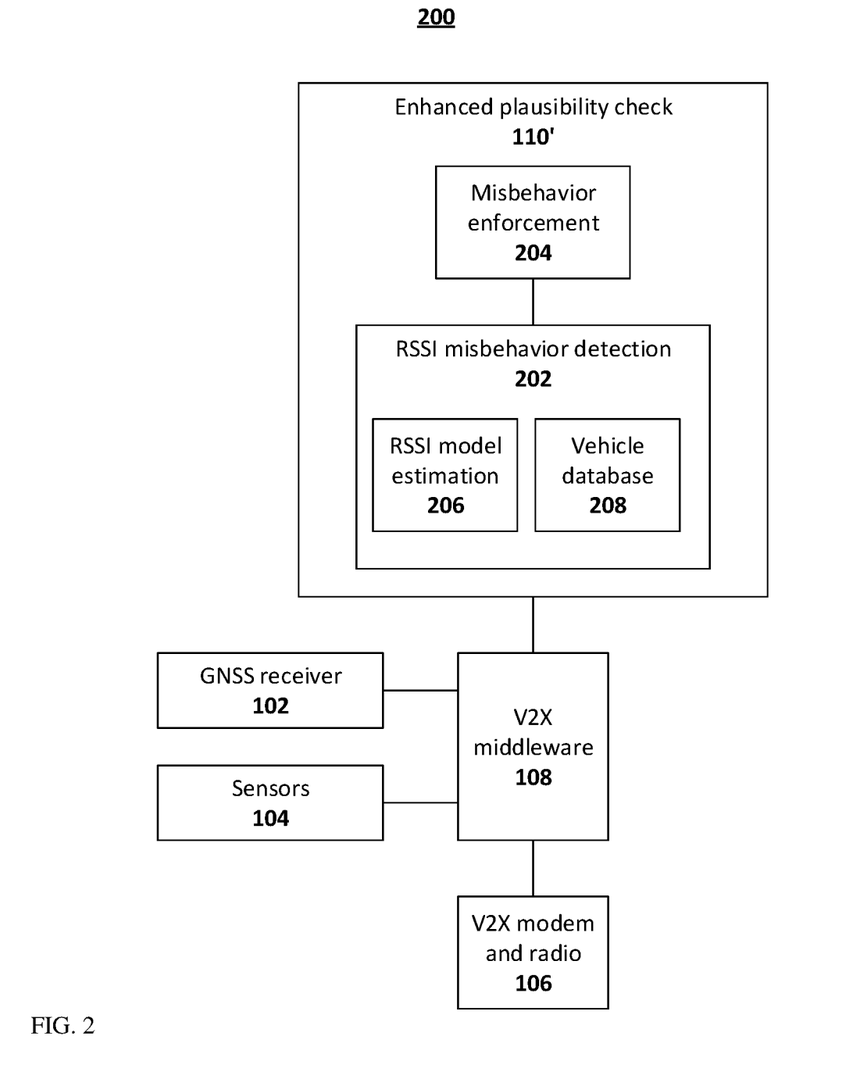
FIG. 2 illustrates a system capable of misbehavior detection based on RSSI disclosed herein.

FIG. 2 illustrates schematically an embodiment numbered 200 of a system for misbehavior detection based on RSSI disclosed herein. Like system 100, system 200 comprises a GNSS receiver 102, inertial sensors 104, a V2X modem and radio unit 106 and middleware 108. Unlike system 100, system 200 further comprises a modified plausibility check unit 110' In addition to being (like unit 100) configurable and operable to analyze each received message, to estimate if the position information received from GNSS receiver 102 and potentially augmented by data received from inertial sensors 104 is plausible, and to detect if GNSS receiver 102 or inertial sensors 104 have been compromised or malfunctioned, modified plausibility check unit 110' is configurable and operable to detect implausible positioning of a misbehaving vehicle, either remote or local, in a dynamic environment. To enable these added functionalities, modified plausibility check unit 110' comprises a RSSI misbehavior detection unit 202 to detect positioning misbehavior and a misbehavior enforcement unit 204 for responding to detected misbehavior, for example by stopping transmission by radio unit 106, by commanding to ignore messages arriving from a specific vehicle or by reporting a misbehaving remote vehicle to a centralized authority. RSSI misbehavior detection unit 202 includes a RSSI model estimation module 206 for estimating and for updating the RSSI model and a vehicle database management module 208 for managing a database of vehicles.

The RSSI model estimation in a mobile environment must be constantly and dynamically adjusted to the changing and unknown surroundings. The misbehavior detection suggested herein is unique in that it analyzes both multiple different neighboring (remote) vehicles as well as the local vehicle. The idea is to have a RSSI model and to match a measured RSSI received from a remote vehicle with a RSSI calculated using the RSSI model (also referred to as "calculated RSSI"). Since the road conditions vary, and vehicles are organized differently on a road, the RSSI model is defined separately for the front and back of a vehicle (i.e. for different sectors). The RSSI model is unique in that it considers the increasing number of obstructions, as reflected in the increased attenuation over distance. Model mismatches between calculated vs. measured RSSI values may indicate a specific implausible remote vehicle, or, if multiple vehicles are found implausible, may indicate implausibility of the local vehicle.

Figure 3:
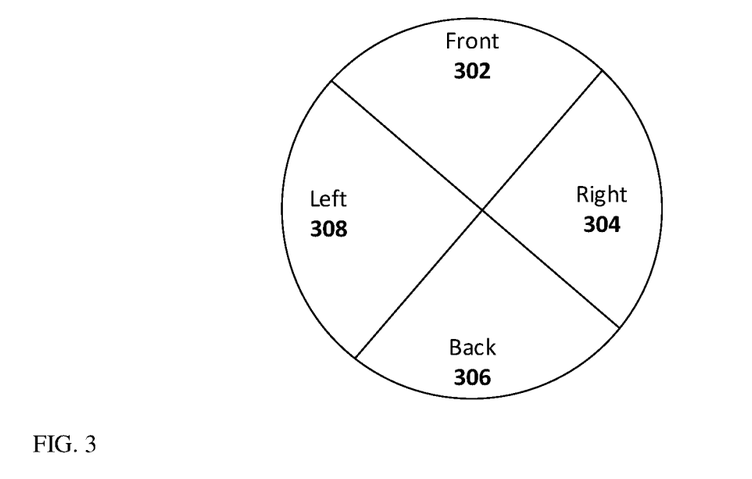
FIG. 3 illustrates the partition of a vehicle frame into sectors for storing variables per specific vehicle orientation.

FIG. 3 illustrates an exemplary partition of a vehicle frame into four sectors: a front sector 302, a right side sector 304, a back sector 306, and a left side sector 308. The partition into four sectors is exemplary. Exemplarily, each sector may cover 90 degrees. Partition into more or fewer than four sectors can be considered, but a higher number of sectors will not improve the results because the environment is dynamic, RSSI is a noisy parameter, most of the vehicles are in the rear and front sectors, and the RSSI model is anyhow estimated. In addition, data points may become too scarce if the number of sectors is too large. A lower (than 4) number of sectors will miss major obstructions or antenna patterns, mixing side vehicles with vehicles in front and rear, and will not be able to detect remote vehicle misalignment.

Figure 4:
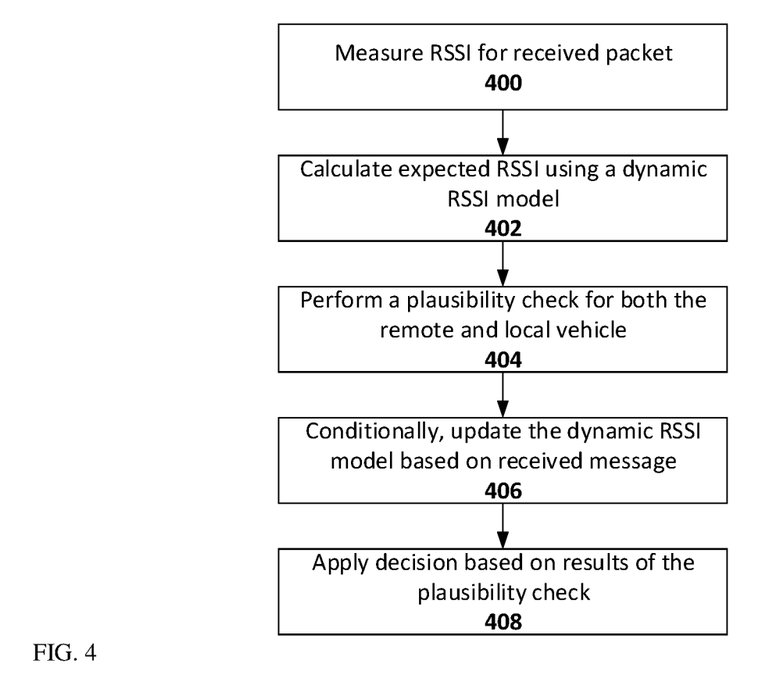
FIG. 4 illustrates schematically in a flow chart a plausibility check according to an embodiment disclosed herein.

FIG. 4 illustrates schematically in a flow chart a plausibility check according to an embodiment disclosed herein. In step 400, a RSSI of a specific remote vehicle is measured. In step 402, a respective expected RSSI for the specific remote vehicle is calculated using a dynamic RSSI model built for the environment using RSSI model estimation module 206. The dynamic RSSI model is built by applying a $2^{nd}$ order model for propagation, i.e. a model that considers both the linear change coefficient of attenuation relative to a logarithm of distance and the change in the linear change coefficient of attenuation relative to the same logarithm of distance. The distance is calculated based on the position value parsed from the message. In step 404, the dynamic RSSI model is updated based on a message received from the specific remote vehicle using RSSI model estimation module 206. In step 406, a plausibility check for both the specific remote vehicle and the local vehicle is performed by RSSI misbehavior detection unit 202 using the specific remote vehicle measured RSSI and the calculated expected RSSI. In step 408, conditionally based on the results of the plausibility check for the specific remote vehicle and the local vehicle, a decision on respective further actions to be performed by the local vehicle is made using misbehavior enforcement unit 204. Exemplary actions performed by the local vehicle are described in steps 516-520 of FIG. 5.

Figure 5:
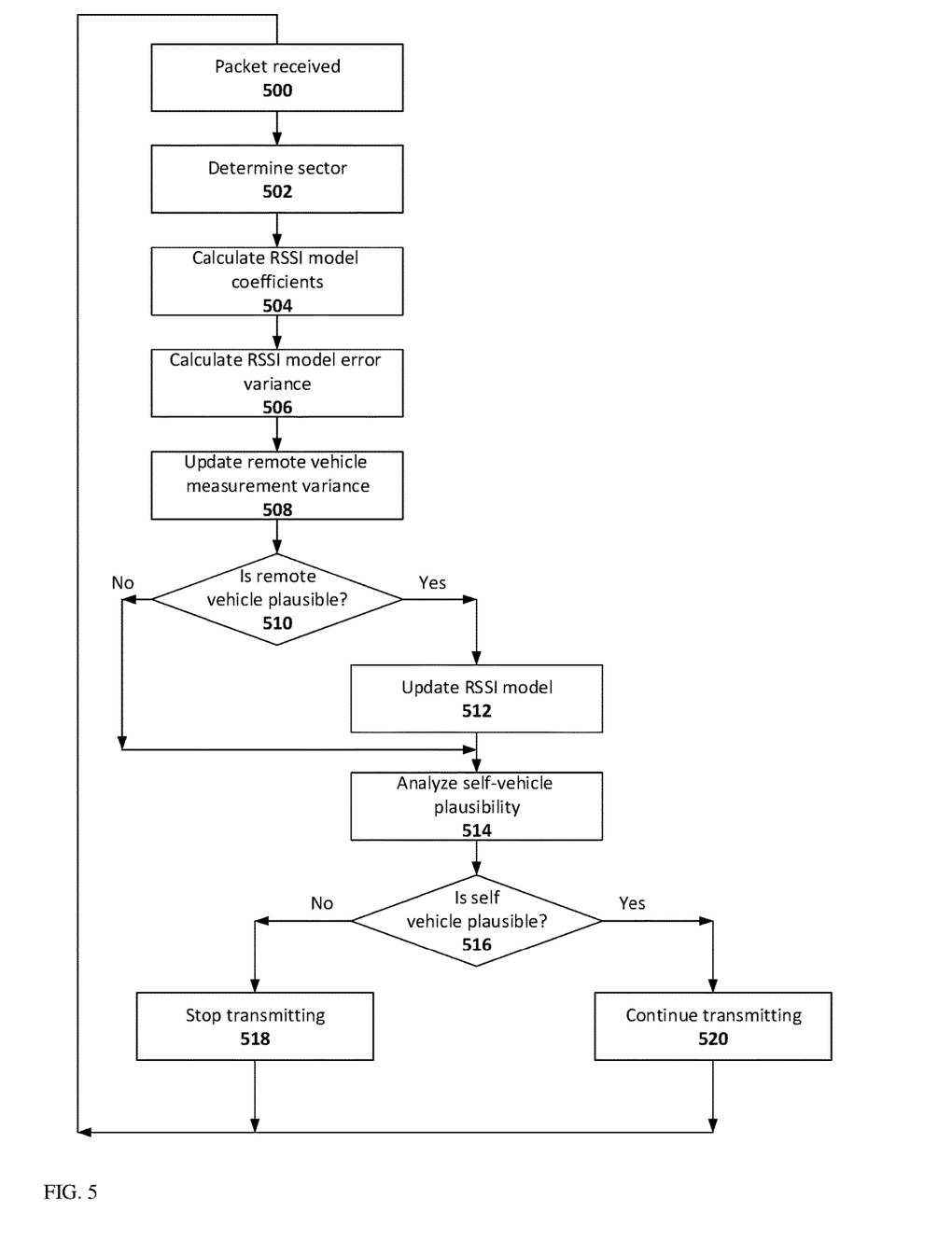
FIG. 5 shows details of steps in the check of FIG. 4.

FIG. 5 shows details of steps in the plausibility check of FIG. 4. Operation begins in step 500 upon any arrival of a message from a remote vehicle. The sector of the specific remote vehicle from which a message is received is determined in step 502. The position of the specific received vehicle, as extracted from the received message, is placed relative to the local vehicle frame. This is performed by subtracting the local vehicle heading from the angle between the local vehicle and the received one. The result is matched with the boundary of each sector, and the relevant sector within which boundaries the received vehicle lies is determined.

In step 504, the measured RSSI and the reported distance value (d) between the two vehicles (i.e. the distance between the position of the local vehicle and the position embedded in the received message) are inserted in an equation to calculate a linear coefficient (n) and a linear coefficient increment (n_inc). For example, the equation is:

$$\text{RSSI (dBm)} = -10n \log 10(d) - 10n\_\text{inc} \times (\log 10(d))^2 + A \quad (1)$$

where A is a constant calibration value, which may be different per sector. For free space, the coefficient n equals to 2. This means that for distance growing by tenfold, the attenuation is doubled. In more challenging channels, the coefficient n can reach a value of 4.

n_inc estimates the growth of n over distance. A first assumed value of n_inc is 0. In a typical scenario, the closest vehicles are less obstructed and have a low value of n (e.g. 2), while vehicles further away suffer more obstructions and the value of n increases (e.g. up to 4). The growth rate in n is actually represented by a step function and not linear as in the equation, as the initial value of n is low and it is incremented with any vehicle located further away from the local vehicle. However, the linear representation in Eq. (1) is simpler for estimation, as the function steps are created by vehicles in unknown and dynamic positions.

Note that Eq. (1) is given as an enabling and exemplary "estimator" equation only. Other, different kind of estimators can be used. Here, for simplicity, first the linear coefficient n is calculated based on the last value of the linear coefficient increment n_inc, followed by calculating the updated value of n_inc. Other estimators can calculate both parameters jointly.

Exemplary Calculation of n and n_inc Per Specific Packet

An exemplary and simplistic calculation of n and n_inc per specific packet is provided next. It is based on a three-step approach. In a first step, an interim n parameter (n_interim) assumes a previous value of model parameter n_inc (e.g. n_inc=0). In a second step, a new value of n is obtained based on the current n value (calculated for the last packet received before the specific packet) and the n_interim value calculated in the first step. In a third step, the value of n_inc is updated using the new value of n. In more detail:

Step 1:

$$n\_interim[n\_inc=0]=(A-RSSI)/(10\times\log10(d))$$

If A=−20, RSSI=−80 and d=100 meters, then n_interim=3.

Step 2:

$$n=f(n, n\_interim)$$

where f is a filter function, see examples below.
For the sake of this example, n=2.9 after this calculation.

Step 3:

$$n\_inc[n=2.9]=(A-RSSI-10n\,\log10(d))/(10\times\log10(d)^2)=0.05$$

Potentially, a step 4 can be added, in which n_inc of step 3 is an interim value, and n_inc=g(n_inc, n_interim) where g is a filter function, see examples below.

The numerical method of calculating n and n_inc in steps 2 and 4 depends on the filter (f and g) implementations, and is based on methods known in the domain of control theory. For example, the filter can be a 1-dimensional Kalman filter. Other models based on a 2-dimensional Kalman filter can be envisioned.

It should be noted that each sector has its own RSSI model, having a different set of variables for n and n_inc and their error variances (which are also calculated in steps 2 and 4).

More importantly, the model is updated only in step 512 (see below) if the measurement is plausible. The calculated values of n and n_inc are stored as interim values, which may be ignored if the received vehicle is plausible, as determined in step 510 (see below).

In step 506, the RSSI model error variance is calculated. The RSSI model variance is adjusted based on the measured RSSI value and the value expected from the model. However, a unique addition is used to increase the RSSI model variance when it is out of bounds. That is, if n is smaller than 2 or larger than 4, the RSSI model variance is increased relative to the deviation between the calculated value of n_interim and the limit (lower than 2 and higher than 4). Also, a n_inc negative or higher than 0.3 will increase the variance as well.

In order to determine if the deviation results from an attack on the remote vehicle or on the local vehicle, each vehicle is checked and graded for plausibility. Specific vehicles can then be isolated from influencing the RSSI model if they are thought to be implausible. Each vehicle has its own vehicle plausibility grade (PG), based on its historical received messages. The first values of vehicle PG and RSSI model variance are assumed. The calculated vehicle PG is updated for the remote vehicle in step 508. Assuming the remote vehicle is unknown, its initial vehicle PG is low.

$$PG\,[vehicle]=PG\,[vehicle]\times(1-alpha)+(1-RSSI\,model\,variance)\times alpha \qquad (2)$$

where alpha is a forgetting factor which may be static (for example, 0.1) or dynamic (for example starting at 0.5 and decreasing to 0.05). A Kalman filter can be applied for optimal filtering. For example, a new remote received vehicle is perfect, such that the RSSI measurement variance is 0. After the first round, with alpha of 0.1, the vehicle PG would be 0.1. Note that essentially both the vehicle PG and the RSSI model variance are calculated the same way—using the gap between a measured RSSI and a RSSI expected from the RSSI model. The RSSI model is calculated per sector and averaged whenever a message is received from any vehicle in the sector, whereas the vehicle PG is averaged whenever a message is received from a specific vehicle regardless of its sector.

In step 510, a check is run to see if the remote vehicle is plausible. The check is based on vehicle PG, for example if higher than 0.5. Other parameters may be considered such as if the RSSI model variance is converging (i.e. decreasing) or increasing slightly (less than 5% for example) from a previous value. If the remote vehicle is found to be implausible, then operation jumps to step 514. If the remote vehicle is found to be plausible, the operation continues from step 512, in which the RSSI model per the specific sector, calculated in step 502, is updated with the interim values, calculated in steps 504 and 506.

In step 514, the local vehicle plausibility is analyzed using several checks. The first checks the convergence of the RSSI model, which is determined by its error variance for all sectors. As used herein, "convergence" means that the RSSI model error variance has a value below a certain level (e.g. 0.2), and that any increase in the RSSI model error variance is temporary. If the error variance increases over a certain period, for example 10% during 1 second, then the plausibility of the local vehicle decreases. Another check checks the absolute value of the error variance. If the error variance is, for example, above 0.3, then the local vehicle plausibility is low. The last check compares the ratio of vehicles marked as implausible with a threshold when the number of total vehicles is sufficient. For example, if there are more than 10 vehicles and 25% of vehicles are implausible, the local vehicle is likely implausible.

Step 516 checks the plausibility of the local vehicle. If the plausibility level of the local vehicle is found to be too low, operation continues from step 518, where the local vehicle V2X unit is expected to stop transmitting, and operation returns to step 500. If the last check ends with the local vehicle found to be plausible, operation continues to step 520, then the local vehicle keeps transmitting.

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein.

For example, any digital computer system can be configured or otherwise programmed to implement a method disclosed herein, and to the extent that a particular digital computer system is configured to implement such a method, it is within the scope and spirit of the disclosure. Once a digital computer system is programmed to perform particular functions pursuant to computer-executable instructions from program software that implements a method disclosed herein, it in effect becomes a special purpose computer particular to an embodiment of the method disclosed herein. The techniques necessary to achieve this are well known to those skilled in the art and thus are not further described herein. The methods and/or processes disclosed herein may be implemented as a computer program product such as, for example, a computer program tangibly embodied in an information carrier, for example, in a non-transitory computer-readable or non-transitory machine-readable storage device and/or in a propagated signal, for execution by or to control the operation of, a data processing apparatus including, for example, one or more programmable processors and/or one or more computers. The term "non-transitory" is used to exclude transitory, propagating signals, but to otherwise include any volatile or non-volatile computer memory technology suitable to the application including, for example, distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by a communication network.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element. It is appreciated that certain features of the invention, which are, for clarity, described in the context of separate embodiments or example, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:

1. A method for plausibility check in a vehicle-to-everything (V2X) dynamic environment in which a local vehicle communicates with remote vehicles, comprising:
    a) obtaining a measured Received Signal Strength Indicator (RSSI) from a specific remote vehicle;
    b) calculating an expected RSSI for the specific remote vehicle using a dynamic RSSI model;
    c) performing a respective plausibility check for each of the specific remote vehicle and the local vehicle using the specific remote vehicle measured RSSI and the calculated expected RSSI, and, based on results of the respective plausibility checks;
    d) deciding on respective further actions to be performed by the specific remote vehicle and by the local vehicle.

2. The method of claim 1, wherein the local vehicle has a frame with a plurality of sectors adjusted thereto, wherein a specific sector of the plurality of sectors is associated with the specific remote vehicle, and wherein (a)-(d) are performed per the specific sector.

3. The method of claim 1, wherein the calculating an expected RSSI for the specific remote vehicle using a dynamic RSSI model includes calculating using a RSSI model dynamically adjusted for each measured RSSI per distance of the specific remote vehicle from the local vehicle.

4. The method of claim 1, wherein the performing a plausibility check includes performing the check using convergence of the RSSI model and an input from a database of plausibilities of received remote vehicles.

5. The method of claim 1, wherein the deciding on respective further actions includes deciding to reduce the plausibility of the local vehicle if a result of the plausibility check indicates that the specific remote vehicle is implausible.

6. The method of claim 1, wherein the deciding on respective further actions includes deciding to stop transmission by the local vehicle if a result of the plausibility check indicates that the local vehicle is implausible.

7. The method of claim 1, wherein the deciding on respective further actions includes deciding to continue transmission by the local vehicle if a result of the plausibility check indicates that the local vehicle is plausible.

8. The method of claim 1, further comprising: if the plausibility check for the specific remote vehicle indicates that the specific remote vehicle is plausible,
    e) updating the dynamic RSSI model.

9. The method of claim 8, wherein the local vehicle has a frame with a plurality of sectors adjusted thereto, wherein a specific sector of the plurality of sectors is associated with the specific remote vehicle, and wherein (a)-(e) are performed per the specific sector.

10. The method of claim 8, wherein the calculating an expected RSSI for the specific remote vehicle using a dynamic RSSI model includes calculating using a RSSI model dynamically adjusted for each measured RSSI per distance of the specific remote vehicle from the local vehicle.

11. The method of claim 10, wherein the calculating using a RSSI model dynamically adjusted for each measured RSSI per distance includes calculating by applying a $2^{nd}$ order model for propagation that considers both a linear change coefficient of attenuation relative to a logarithm of the distance and a change in the linear change coefficient of attenuation relative to the same logarithm of distance.

12. A system for plausibility check in a vehicle-to-everything (V2X) dynamic environment in which a local vehicle communicates with remote vehicles, comprising:
   a) means for obtaining a measured Received Signal Strength Indicator (RSSI) from a specific remote vehicle; and
   b) a modified plausibility check unit configurable and operable to apply a dynamic RSSI model to detect implausible positioning of the specific remote vehicle and/or of the local vehicle based on the measured RSSI of the specific remote vehicle and on a RSSI calculated for the specific remote vehicle.

13. The system of claim 12, wherein the modified plausibility check unit comprises a RSSI misbehavior detection unit that includes a RSSI model estimation module for estimating and for updating the dynamic RSSI model.

14. The system of claim 12, wherein the modified plausibility check unit comprises a vehicle database management module for managing a database of vehicle plausibilities used in plausibility checks.

15. The system of claim 12, wherein the modified plausibility check unit comprises a misbehavior enforcement unit for responding to detected misbehavior by deciding on respective further actions to be performed by the specific remote vehicle and by the local vehicle.

16. The system of claim 13, wherein the modified plausibility check unit further comprises a vehicle database management module for managing a database of vehicle plausibilities used in plausibility checks.

17. The system of claim 13, wherein the modified plausibility check unit further comprises a misbehavior enforcement unit for responding to detected misbehavior by deciding on respective further actions to be performed by the specific remote vehicle and by the local vehicle.

18. The system of claim 14, wherein the modified plausibility check unit further comprises a misbehavior enforcement unit for responding to detected misbehavior by deciding on respective further actions to be performed by the specific remote vehicle and by the local vehicle.

19. The system of claim 12, wherein the local vehicle has a frame with a plurality of sectors adjusted thereto, wherein a specific sector of the plurality of sectors is associated with the specific remote vehicle, and wherein the a modified plausibility check unit is configurable and operable to apply the dynamic RSSI model for the specific sector.

20. The system of claim 13, wherein the local vehicle has a frame with a plurality of sectors adjusted thereto, wherein a specific sector of the plurality of sectors is associated with the specific remote vehicle, and wherein the a modified plausibility check unit is configurable and operable to apply the dynamic RSSI model for the specific sector.

\* \* \* \* \*